United States Patent
Xu et al.

(10) Patent No.: US 7,853,259 B2
(45) Date of Patent: Dec. 14, 2010

(54) METHODS FOR AIR INTERFACE MESSAGE TRANSFER IN FAST CALL SETUP PROCESSES

(75) Inventors: Baikui Xu, Shanghai (CN); Ling Lv, Shanghai (CN); Tao Wu, Eastwood (AU)

(73) Assignee: Spreadtrum Communications Inc., George Town, Grand Cayman (KY)

( * ) Notice: Subject to any disclaimer, the term of this patent is extended or adjusted under 35 U.S.C. 154(b) by 684 days.

(21) Appl. No.: 11/639,979

(22) Filed: Dec. 15, 2006

(65) Prior Publication Data

US 2007/0165595 A1    Jul. 19, 2007

(30) Foreign Application Priority Data

Jan. 18, 2006   (CN) ................. 2006 1 0023423

(51) Int. Cl.
*H04W 4/00* (2009.01)
(52) U.S. Cl. .................................. 455/435.1
(58) Field of Classification Search .............. 455/435.1, 455/435.3
See application file for complete search history.

(56) References Cited

U.S. PATENT DOCUMENTS

| | | | | |
|---|---|---|---|---|
| 6,952,411 | B2 * | 10/2005 | Sinnarajah et al. | 370/335 |
| 7,440,763 | B2 * | 10/2008 | Lundsjo et al. | 455/458 |
| 2004/0002337 | A1 * | 1/2004 | Wheeler et al. | 455/445 |
| 2005/0141511 | A1 * | 6/2005 | Gopal | 370/395.2 |
| 2005/0260995 | A1 * | 11/2005 | Kim | 455/445 |
| 2007/0041343 | A1 * | 2/2007 | Barreto et al. | 370/329 |

OTHER PUBLICATIONS

Ghadialy, Zahid "3G UMTS Complete Mobile Originated Circuit Switched Call Setup" <http://www.3g4g.co.uk/Tutorial/ZG/zg_mocs_setup.html> 2004.*

* cited by examiner

*Primary Examiner*—Vincent P Harper
*Assistant Examiner*—Michael Irace

(57) ABSTRACT

A method of UU message transfer for fast call setup. The method includes encapsulating a Service Request into a RRC Connection Request. When a UE starts the service sensitive to call setup delay, the RRC layer encapsulates the Service Request into IDT. If this encapsulation is successful, the RRC connection request message undergoes non-critical extension, and the encapsulated IDT is disposed into the extended portion. The RNC, after receiving the extended RRC connection request, extracts the IDT message from the extended RRC CONNECTION REQUEST and sends it to the CN.

1 Claim, 4 Drawing Sheets

METHODS FOR AIR INTERFACE MESSAGE TRANSFER IN FAST CALL SETUP PROCESSES

TECHNICAL FIELD

The present disclosure relates to methods for call/session setup in Universal Mobile Telecommunications System (UMTS); in particular, to methods for air interface message transfer in fast call setup processes.

BACKGROUND

In communication systems, the duration of call setup (or call setup delay) is a main factor affecting Quality Of Service (QOS). For services sensitive to such delays, such as interactive games and Push to talk Over Cellular services (PoC), the call setup delay in current UMTS systems (usually 6 to 10 seconds) appear to be too long.

The following description is a brief introduction of a call setup process in a typical UMTS system, using a User End (UE) calling another UE as an example. The call setup process flow is illustrated in FIG. 1 and FIG. 2. These figures incorporate several main functional units, such as a User End (UE), a NodeB, a Radio Network Controller (RNC), and a Core Network (CN). In addition, both figures presume that a user initiates a PoC service call in a Packet Service (PS) domain, and a Radio Resource Control (RRC) connection is established on a Dedicated Channel (DCH).

For the originating UE, a call setup process usually includes the following steps:
1) RRC connection establishment
2) Non Access Stratum (NAS) signaling connection establishment and NAS signaling exchange
3) Radio Access Bearer (RAB) establishment For the receiving UE, the call setup process is similar to that of the originating UE and mainly includes the following steps:
1) Paging process
2) RRC connection establishment
3) Non Access Stratum (NAS) signaling connection establishment and NAS signaling exchange
4) Radio Access Bearer (RAB) establishment The following description further analyzes each step of the process described above. The purpose of establishing a RRC connection is to build a dedicated signaling connection between a UE and a UTRAN (UMTS Terrestrial Radio Access Network including several RNCs and NodeBs) for transferring signaling between the UE and the UTRAN, or between the UE and the CN. In FIG. 1, phase 1:RRC depicts a RRC connection establishment procedure when the UE is in an idle mode.

The purpose of establishing the NAS signaling connection is to build a signaling connection between the UE and the CN. The NAS signaling connection establishment and signaling exchange are shown as Phase 2:NAS in FIG. 1 and FIG. 2. The signaling mainly include Service Request for the originating UE, IU connection (between the RNC and CN), Signaling Connection Control Part (SCCP) establishment, authentication and encryption request, Security Mode configuration, Temporary Mobile Subscriber Identity (TMSI) reallocation, Activate Packet Data Protocol (PDP) activation request, etc.

After NAS signaling connection is established, RAB establishment is started as shown by phase 3:RAB in FIG. 1 and FIG. 2. The CN sends a RAB Assignment Request to the RNC. After receiving the request, the RNC maps from the RAB to a Radio Bearer (RB), and then reconfigures RL (Radio Link), establishes ALCAP, and synchronizes FP to NodeB. Then, the RNC sends a RB Setup message to the UE. After receiving this message, the UE configures RLC, MAC and physical layer and then sends a RB Setup Complete message to the RNC. The RNC, after configuring RLC and MAC, sends a RAB Assignment Response to the CN to notify the successful setup of the RAB at the UTRAN side. The CN then sends an Activate PDP Context Accept message to the UE to inform the UE that data transfer can now commence. Thus, RAB setup is now successful.

From the analysis above, it is clear that the call setup process involves many signaling/data connection processes that result in a long call setup delay. The call setup delay in a UMTS system is longer than that of a GSM system. Therefore, for services sensitive to call setup delay, it is necessary to reduce the call setup delay in a UMTS system in order to improve user satisfaction.

DETAILED DESCRIPTION

Figure 1:
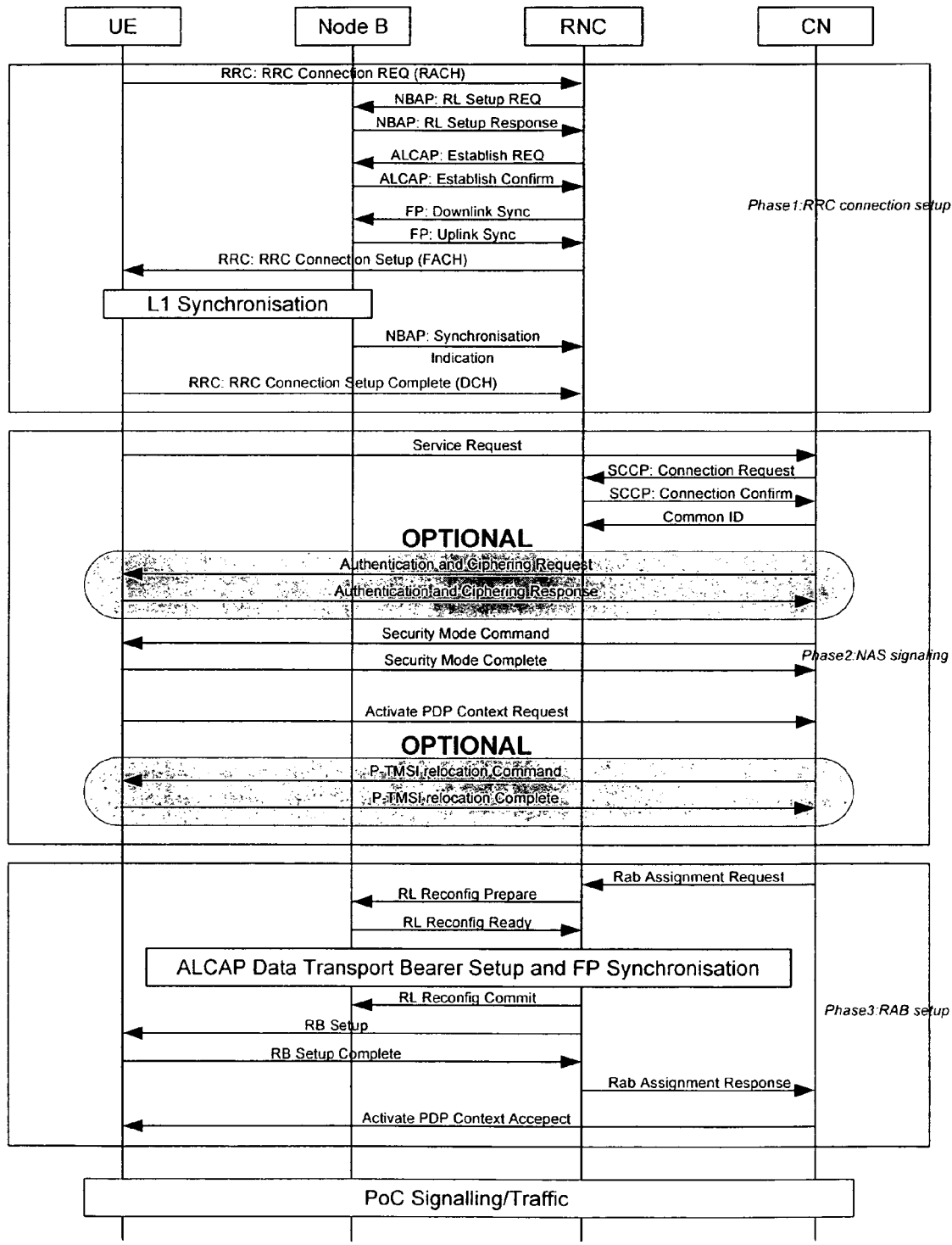
FIG. 1 is a flow chart of a call setup process in accordance with the prior art.
Figure 2:
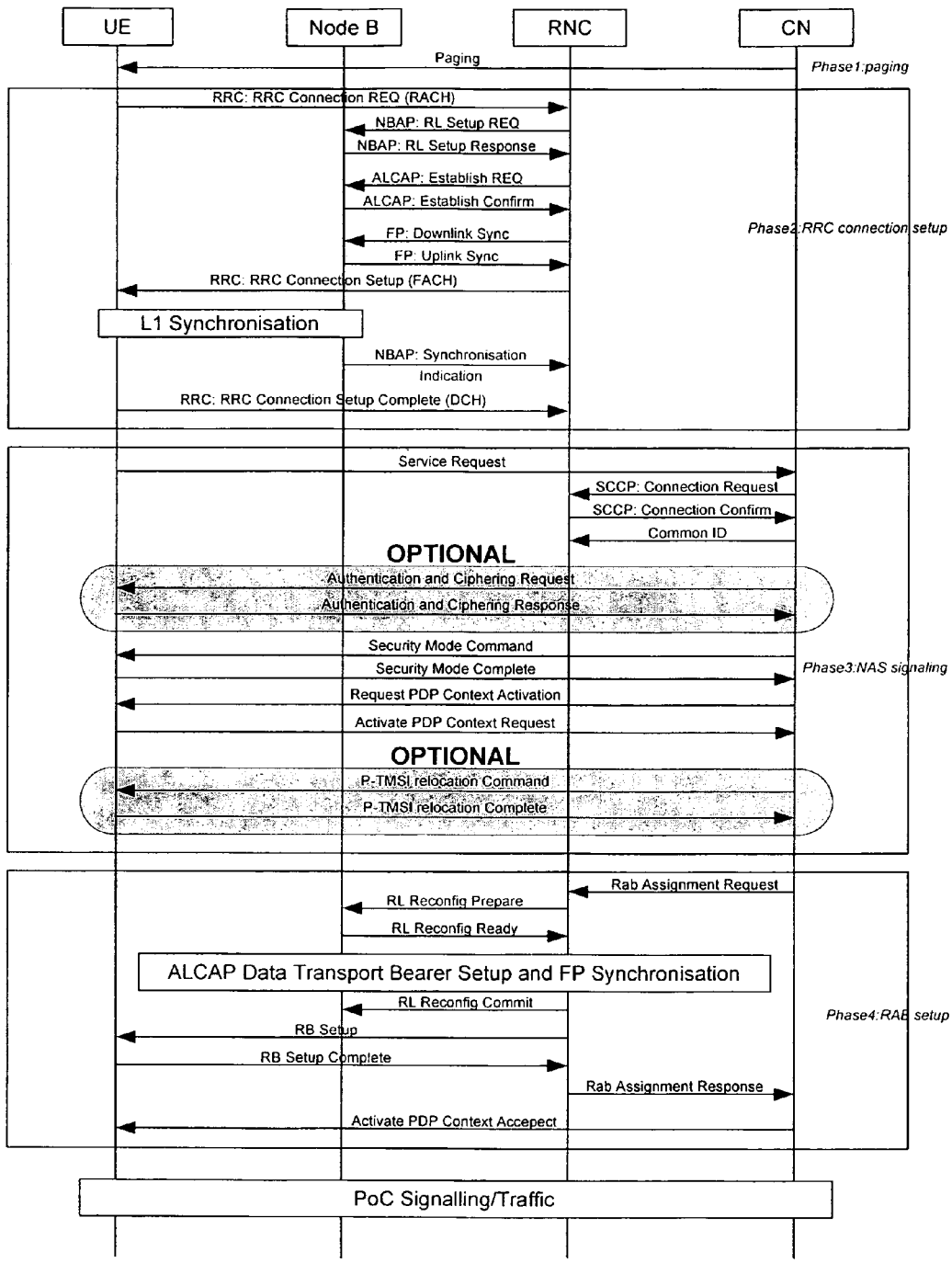
FIG. 2 is a flow chart of a call setup method in accordance with the prior art.

The present disclosure provides a method of message transfer in UU interface for fast call setup. Embodiments according to the present disclosure solve the drawback of long call setup delay in the present systems due to excessive signaling procedures. Embodiments of the disclosed method can be applied to services sensitive to call setup delay.

A method according to an embodiment of the present invention includes encapsulating a Service Request in a RRC CONNECTION REQUEST. The method can include the following steps:

Step 1: When the UE starts a service sensitive to call setup delay, the NAS of the UE informs the RRC layer whether to start fast call setup procedure. If not, the UE will start RRC connection request directly; if so, proceeds to Step 2.

Step 2: the RRC layer of the UE encapsulates a Service Request into an Initial Direct Transfer (IDT) message. If the encapsulation is successful, proceeds to Step 3; otherwise, the RRC of the UE will proceed as usual, i.e., the RRC sends the RRC CONNECTION REQUEST directly.

Step 3: non-critically extending the RRC CONNECTION REQUEST to dispose the encapsulated IDT into the extended portion.

The RNC, after receiving the extended RRC CONNECTION REQUEST, encapsulates the service request from the NAS layer into a IU message, and then transmits the IU message to the CN.

The method includes the connection establishment process for the originating UE and the receiving UE. For the originating UE, the method includes:

1) modifying the RRC CONNECTION REQUEST message by encapsulating the Service Request from the NAS, transmit the Service Request to the CN via the RNC, then, the CN transmits the RAB Assignment Request message to the RNC;

2) modifying the RRC CONNECTION SETUP message by adding RB parameters corresponding to the requested service. The RNC then maps from RAB to RB parameters after receiving RAB Assignment Request message, and sends the extended RRC CONNECTION SETUP message to inform the UE to establish both the signaling channel and the service channel.

3) After receiving the extended RRC CONNECTION SETUP, the UE configures the signaling channel and the service channel at the same time. After physical layer synchronization, a RRC Connection Setup Complete message will be sent on the dedicated signaling channel, indicating that signaling and service channel setup is successful.

For the terminating UE, signaling procedures are similar to those of the originating UE except the addition of a paging process.

In one aspect of the method described above, parameters, such as RLC, MAC, Transport Channel (TrCH), PhyCH, corresponding to the service are added to the RRC Connection Setup message. In another aspect of the method for UU message transfer, a default configuration or a pre-configuration can be utilized, and semi-static channel parameters (e.g., RB, RLC, and TrCH), corresponding to signaling and service, can be stored in the UE. In another aspect of the method for UU message transfer, the RRC Connection Setup Complete message can be modified, i.e., by adding content relating to the RB setup being successful. In a further aspect of the method for UU message transfer, for the terminating UE, the paging message is derived by adding an indicator of service type to be established to an original paging message. The UE uses signaling procedures corresponding to optimization scenario, if the UE determines that the service is a PoC service.

As described above, embodiments according to the present invention has the following technical results:

1. The modification of the RRC CONNECTION REQUEST message, including encapsulating the Service Request of the NAS, can enable the RNC to send the Service Request to the CN earlier, so that the CN can send the RAB Assignment Request to the RNC earlier than in present systems.

2. Embodiments of the method do not include the procedures of Authentication, Ciphering, Security Mode, TMSI reallocation during call setup to simplify NAS signaling, and thus, call setup delay can be shortened.

3. During operation, the RRC Connection Setup message is modified by adding parameters such as RB, RLC, MAC, TrCH, PhyCH, corresponding to the desired service. The RNC maps the RAB to RB parameters after receiving the RAB Assignment Request message from the CN, and sends the extended RRC CONNECTION SETUP message to inform UE to establish both signaling channel and service channel. Furthermore, a default configuration or a pre-configuration can be utilized, and semi-static channel parameters (such as RB, RLC, TrCH) corresponding to signaling and service can be saved in the UE in advance to decrease the size of RRC Connection Setup message. As a result, transport delay of the RRC Connection Setup message can be shortened. Also, combining the RRC Connection Setup and RB Setup processes can shorten call setup delay.

The present disclosure provides a method of UU message transfer for fast call setup. The following description uses a call setup procedure of PoC Service as an example to illustrate the disclosed invention. As further described below, the procedure encapsulates a Service Request in a RRC Connection Request. The procedure includes the following steps:

Step 1: When a UE starts a service sensitive to call setup delay, such as PoC, the NAS of UE informs the RRC layer whether to start a fast call setup procedure. If not, the RRC will start a RRC connection request directly according to the process described in the 3GPP protocol, 25.331. If so, then Step 2 is performed.

Step 2: the RRC of the UE encapsulates a Service Request into an Initial Direct Transfer (IDT) message. Specifically, in addition to encapsulating the Service Request into a "NAS message" IE (Information Element) of the IDT, the RRC will assign the "Message Type" IE to be IDT, configure "CN domain identity" IE to be the CN identity assigned by NAS, and configure "Intra Domain NAS Node Selector" IE to be TMSI/PTMSI, IMSI or IMEI (See reference in 25.331). Also, for the other available IEs, the RRC of the UE can choose not to fill in. If the RRC of the UE encapsulates the IDT message successfully, Step 3 is performed; otherwise, the RRC layer of the UE proceeds according to the regular process, i.e., the RRC sends the RRC CONNECTION REQUEST directly after receiving the Service Request.

Step 3: non-critically extending the RRC connection request message to dispose the encapsulated IDT into the extended portion. For example, a "Direct Transfer Message" IE can be added to the RRC connection request message, and dispose the IDT into this IE.

The RNC, after receiving the extended RRC connection request message, processes the received message as follows:

The RRC layer reads the "Direct Transfer Message" IE, and proceeds according to the original IDT message, i.e., reading each IE in the IDT message, encapsulating the NAS message into IU interface Initial UE Message, and then sending the Initial UE Message to the CN.

Figure 3:
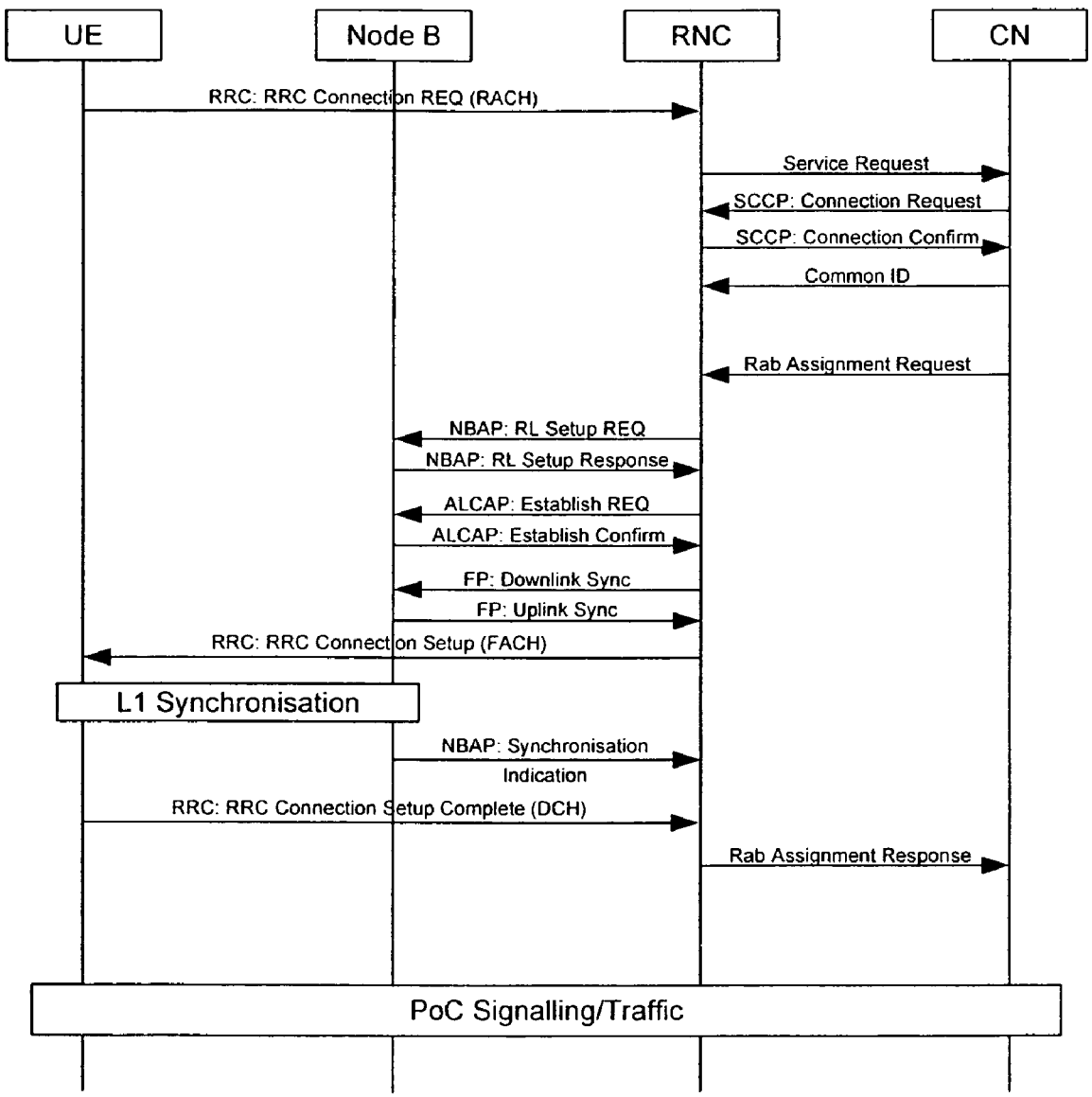
FIG. 3 is a flow chart of a call setup method in accordance with an embodiment of the invention.
Figure 4:
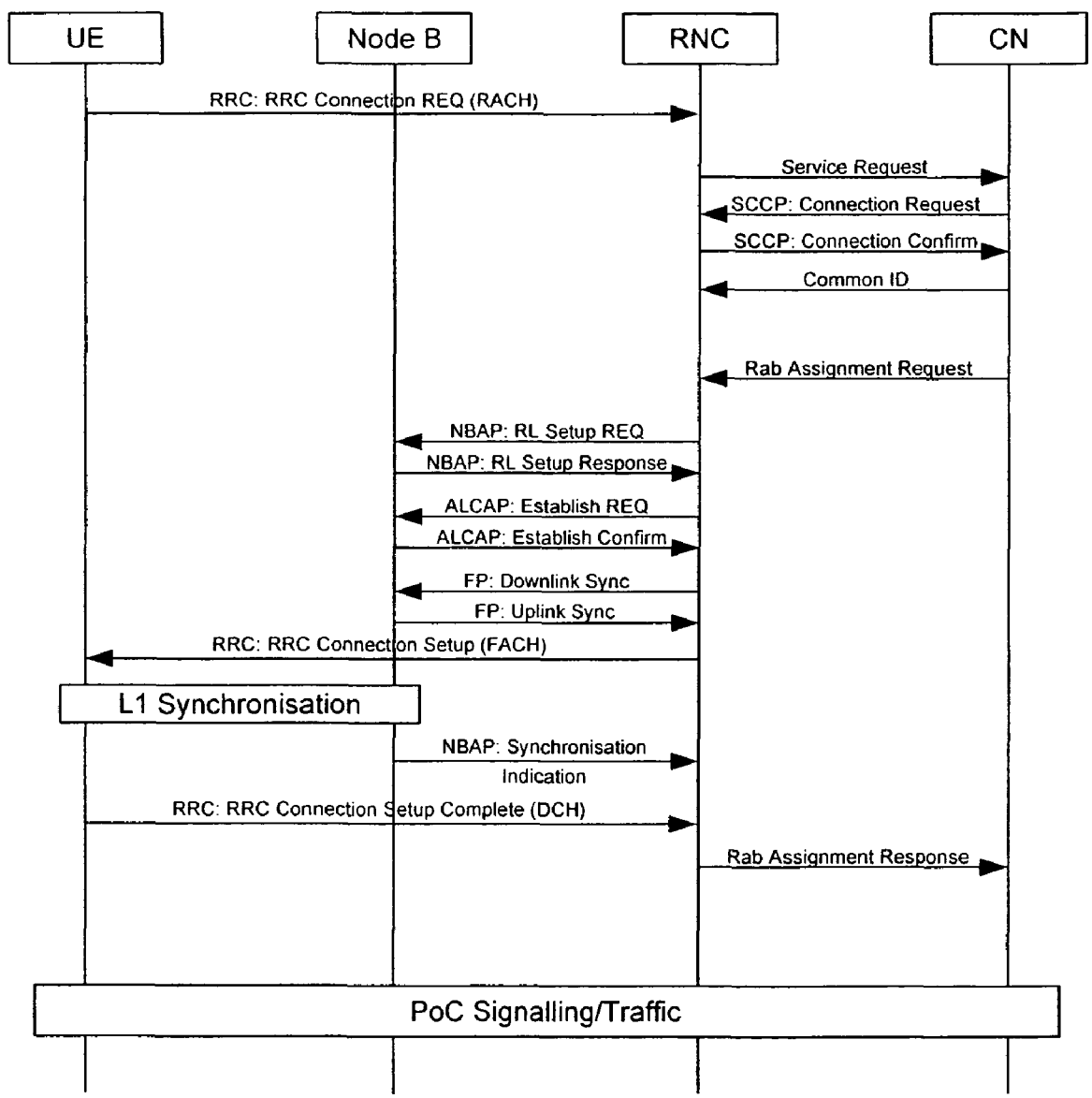
FIG. 4 is the flow chart of the call setup method in accordance with an embodiment of the invention.

FIG. 3 and FIG. 4 depict the signaling/data connection process at the originating end and the terminating end.

For the originating UE:

1. the RRC connection request message is modified to encapsulate the Service Request from the NAS. As a result, the RNC can send the Service Request to the CN earlier, so that the CN can send the RAB Assignment Request to the RNC earlier.

2. During Call Setup, not performing Authentication, encryption, Security Mode, and TMSI reallocation procedures. With this simplified NAS signaling, call setup delay can be shortened.

3. RRC Connection Setup of the originating call is modified to add parameters, such as RB, RLC, MAC, TrCH, PhyCH. The RNC maps the RAB to the RB after receiving the RAB Assignment Request message from the CN, and sends the extended RRC Connection Setup message to the UE informing the UE that both the signaling channel and the service channel need to be established. Furthermore, default configuration or pre-configuration can be utilized to store semi-static channel parameters (e.g., RB, RLC, TrCH) in the UE in advance to decrease the size of RRC Connection Setup so that transport delay of RRC Connection Setup can be shortened. Combining the RRC Connection Setup and the RB Setup can shorten call setup delay.

4. The UE configures signaling and service channel after receiving the extended RRC Connection Setup message. After physical layer synchronization, The UE transmits the extended RRC Connection Setup complete message (this message is derived from modifying the RRC Connection Setup Complete message by adding the RB Setup Complete message into the RRC Connection Setup Complete) on the dedicated signaling channel, indicating that signaling and service channel setup is successful.

For the terminating UE, the procedures are similar to those of the originating UE, except the procedures include paging for the terminating UE. The paging message is based on previous paging message but added the indicator of a service type to be established, and procedures invoking an optimization scenario corresponding the UE determining that the new service is a PoC service.

From the foregoing, it will be appreciated that specific embodiments of the invention have been described herein for purposes of illustration, but that various modifications may be made without deviating from the invention. Certain aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A method for fast call setup for originating User Equipment (UE) and terminating User Equipment, comprising:

Step 1: when the originating UE starts a service sensitive to call setup delays, NAS (Non-access Stratum) of the UE informing a RRC layer whether to start fast call setup procedure, If not, the RRC (Radio Resource Control) starting RRC connection request directly, if so, here going to step 2;

Step 2: RRC layer of UE encapsulating Service Request into Initial Direct Transfer (IDT), if it is successful, proceeding to Step 3, otherwise, RRC sending RRC CONNECTION REQUEST directly;

Step 3: RRC CONNECTION REQUEST undergoing the process of non-critical extension, wherein the encapsulated IDT is put into the extended part, RNC, after receiving the extended RRC CONNECTION REQUEST, taking the IDT message from the extended RRC CONNECTION REQUEST, and then encapsulating the Service Request message from IDT and sending it to CN, wherein the method further comprises signaling procedures of the UE's:

for the originating UE:

1) RRC connection Request is modified, in which Service Request from NAS is encapsulated, Service Request is sent to CN through RNC, and CN send RAB (Radio Access Bearer) assignment request message to RNC;

2) RRC Connection Setup is modified, and RB (Radio Bearer) parameters of service are added into the extended part, RNC undertake the mapping from RAB to RB parameters after receiving RAB Assignment Request message from CN, and send the extended RRC CONNECTION SETUP on air interface to inform UE that both signaling channel and service channel are to be established in parallel;

3) after receiving RRC Connection Setup, UE configure signaling and service channel at the same time, after layer 1 synchronization, RRC Connection Setup Complete be sent on the completed dedicated signaling channel, indicating that signaling and service channel setup is successful;

for the receiving UE: signaling procedures are similar to those of the originating call, with an exception of paging, wherein the RRC Connection Setup Complete is a result of the modification of RRC connection setup complete, that is, the related RB Setup Complete message is added into RRC Connection Setup Complete message.

* * * * *